No. 788,307. PATENTED APR. 25, 1905.
G. H. DORR.
CAMERA.
APPLICATION FILED DEC. 5, 1902.
2 SHEETS—SHEET 1.
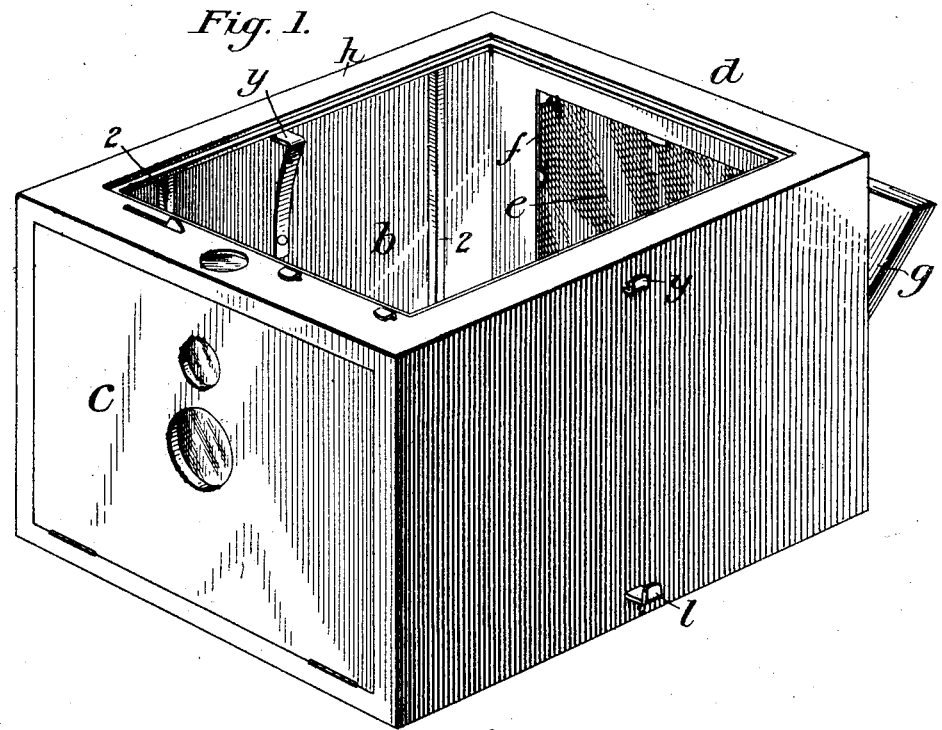
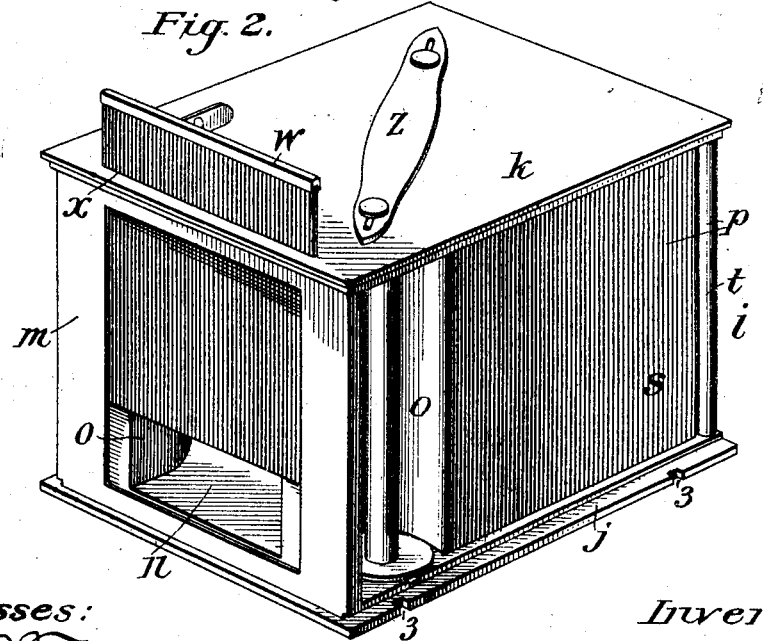
Witnesses:
F. R. Fitton
E. P. Barger
Inventor:
George H. Dorr
By William F. Hall
Att'y.

No. 788,307. PATENTED APR. 25, 1905.
G. H. DORR.
CAMERA.
APPLICATION FILED DEC. 5, 1902.
2 SHEETS—SHEET 2.
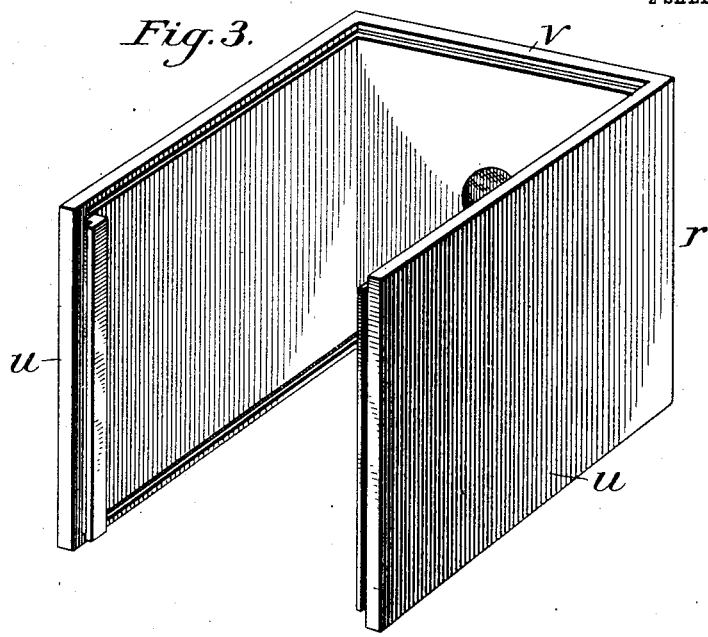
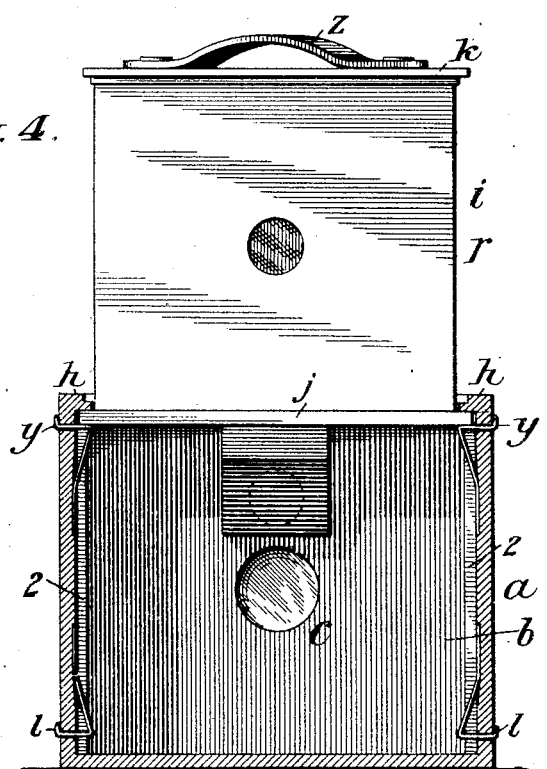

No. 788,307. Patented April 25, 1905.

UNITED STATES PATENT OFFICE.

GEORGE H. DORR, OF NEW ROCHELLE, NEW YORK, ASSIGNOR TO BLAIR CAMERA COMPANY, OF ROCHESTER, NEW YORK, A CORPORATION OF MAINE.

CAMERA.

SPECIFICATION forming part of Letters Patent No. 788,307, dated April 25, 1905.

Application filed December 5, 1902. Serial No. 133,940.

*To all whom it may concern:*

Be it known that I, GEORGE H. DORR, of New Rochelle, in the county of Westchester and State of New York, have invented certain new and useful Improvements in Cameras, of which the following is a specification.

My invention relates to film photographic cameras or to that type of photographic cameras in which a sensitive film or band is employed having a plurality of receiving-sections which are successively brought into register with the camera-lens to receive the image.

In the common construction of film-camera after the sensitive film is placed within its holder or within the camera in the line of the light-rays passing through the lens it is not removed from said position until after all of the pictures which it is intended to take thereupon are secured. The ordinary film is provided at each end with a protecting-strip, one of which is wrapped about the sensitive surface of the film when the cartridge is placed upon the market, so as to exclude the light from said sensitive surface, thereby permitting the same to be handled and placed in the camera without taking the same in a dark room, while the other strip is wrapped about the film by the rotation of the receiving-roller as the end of the film is reached, so as to complete the cover and protect the sensitive surface thereof prior to removing the cartridge from the camera. After the film is partly unrolled to so position the same that the sensitive surface thereof will be exposed to the rays of light passing through the lens of the camera when the shutter controlling said lens is opened the film cannot be lifted from the camera-box without exposing said sensitive surface to the light which deleteriously acts upon the same, and consequently the camera cannot ordinarily be focused for each individual exposure or for each receiving-section of the film prior to taking the individual pictures thereupon.

It is the object of my invention to provide a film-camera including a part carrying a lens and a focusing ground glass and a second part providing a casing or holder for the film and to provide means which will permit the holder or casing to be readily moved in relation to the lens-carrying section without exposing the film to the light and without wholly detaching the holder from said section to bring said film out of register with the lens and out of the path of the light-rays passing through the latter, so that the camera may be focused prior to exposing each receiving-section of the film or for each picture it is desired to take.

A further object is to provide means for shifting the film out of the light-rays or from its normal position between the lens and the ground glass in order that the camera may be focused, the construction of the parts being such that the film may be shifted, as described, without affecting the feed thereof or the position of the carrying or receiving roller relative to each other.

Other objects of the invention will be understood and the many advantages thereof appreciated when the same is more fully described.

The invention includes the construction and combination of parts to be hereinafter described, and particularly pointed out in the claims.

While the invention is susceptible of various modifications, I have illustrated in the accompanying drawings and shall hereinafter describe what is now conceived to be the preferred embodiment of the same.

In the drawings, Figure 1 is a perspective view of the lens and focusing-glass-carrying box or section with the film-holder removed therefrom. Fig. 2 is a perspective view of the film-holder, showing the outer casing thereof removed from the same. Fig. 3 is a perspective view of this casing. Fig. 4 is a transverse sectional view through the assembled camera.

In the accompanying drawings the outer box of the camera is designated by the letter *a* and includes a film-holder chamber *b*, a lens and shutter mechanism section *c*, arranged in advance of said chamber, and a focusing-section *d*, arranged upon the opposite side of the chamber *b* to the section *c*, in which an ordinary ground focusing-glass *e* is located. The rear wall or side of the box $a$ is provided with an opening $f$, normally closed by a door $g$, and in advance of said door opening between the same and the lens the ground glass $e$ is arranged.

The film-holder is telescopically mounted in the receiving-chamber $b$ and when in normal position substantially fills the same, the top thereof having a surrounding flanged edge which overhangs the upper edges of the walls of said chamber $b$. As premised, the holder is telescopically mounted in the box $a$ and is designed to be partly withdrawn from the receiving-chamber $b$ through the top thereof to move the film out of the path of the light-rays passing through the lens, thus leaving an unobstructed space between the ground glass $e$ and said lens. The upper edges of the walls of the chamber $b$ are provided with inwardly-extending flanges overhanging slightly the said receiving-chamber, and the bottom of the film-holder is provided with a coacting flange which abuts against the flanges $h$ when the holder is withdrawn from the chamber $b$ and serves to completely close the latter and prevent the penetration of light thereinto. With the holder withdrawn, as described, to focus the camera it is only necessary to lower the door $g$ and view the image in the ordinary way upon the ground glass $e$. After the proper focus is obtained the holder is lowered or pressed back into the chamber $b$, which brings the section of the film extending between the carrying and receiving rolls or spindles journaled in the holder in the compass of the light-rays passing through the lens in substantially the usual way.

As will be appreciated by those having a knowledge of photography, it is essential that means be provided to protect the sensitive surface of the film against the penetration of light when the holder is withdrawn from the box in order to focus the camera in the manner hereinbefore set forth, and in the accompanying drawings I have illustrated one embodiment of my invention for effecting this purpose.

The film-holder $i$ includes a bottom, (designated by the letter $j$,) a top $k$, hereinbefore referred to, a front plate or wall $m$, provided with a central opening $n$, designed to be registered with the lens-opening, film-spool chambers $o$, and film-guides $p$, located between the bottom and top $j$ $k$, and a detachable inclosing casing $r$.

The spool-chambers are located on opposite sides of the holder $i$ adjacent to the front wall $m$ thereof and are provided with bearings to receive the journals of the ordinary roll carrying and receiving spindles, which are mounted in said chambers in any well-known or improved manner.

The film-guides include side plates $s$, arranged between the top and bottom $j$ $k$ adjacent to the side edges thereof, and extend from the rear walls of the roll-chambers to within close proximity to the rear edge of the holder $i$. At the rear edges of said plates $s$ guide-rollers $t$ for directing the film are journaled, the rear end of the holder $i$ being left entirely open to expose the sensitive surface of the film extending between the two guide-rollers $t$.

The detachable inclosing casing $r$, forming a part of the holder, includes corresponding sides $u$ and a connecting member $v$, having a central sight-opening therein, with which characters indicative of the individual sensitive or receiving section of the film are intended to register, said opening being covered by a translucent plate. The free or front vertical edges of the sides $u$ are intended to be detachably secured to the opposite vertical edges of the fixed front wall $m$, while the upper and lower edges of the three sections of the casing fit snugly between the opposing faces of the bottom and top $j$ $k$, so that when said inclosing casing is in place the film is completely inclosed and protected from the light, except such rays as may pass through the opening $n$, before referred to. It will be understood that the inclosing casing $r$ is normally secured in place and is only detachable from the remaining part of the holder $i$ to load the camera or to remove the used films.

When the holder $i$ is within the box $a$, light-rays can only pass through the opening $n$ by first passing through the lens-opening and lens, and as the former is closed by the ordinary shutter except when making an exposure the film is completely protected from the rays of light at other times.

To prevent the light-rays passing through the opening $n$ when the holder is withdrawn from the box $a$ to permit the camera to be focused, a slide $w$ is preferably associated with the front wall $m$, which is designed to completely close the opening $n$ therein. This slide is guided in channel-ways arranged upon either the front or rear face of the wall or plate $m$ to move directly across said opening and close the same. The upper end of this slide preferably projects through a slot $x$ in the top $k$ of the holder and is provided with a shoulder or other means to facilitate the same being grasped by the hand in order to shift the same.

When the holder $i$ is entirely within the receiving-chamber $b$, the slide $w$ is drawn out to uncover the opening $n$, so that the light-rays may pass unobstructedly therethrough whenever the shutter is shifted to expose the lens; but before withdrawing the holder the slide is pushed down across said opening $n$ to completely close the same.

To support the holder $i$ in its raised position, so that the operator may have both hands free to manipulate the camera, spring catches or clips $y$ are associated with the upper portions of each side wall of the chamber $b$, said clips having horizontal portions or shoulders which snap beneath the bottom *j* as soon as the holder reaches the limit of its outward movement. The ends of the horizontal portions of the clips *y* project through the said side walls of the box *a* and are provided with upturned ends which may be readily grasped by the fingers to pull said supporting portions outwardly therethrough, disengaging the same from the bottom *j* of the holder, allowing the latter to drop back in the receiving-chamber *b*. To lock the holder in its normal position in the box *a* or chamber *b* thereof, so that the camera may be carried by the hand-strap *z*, secured to the top *k* of the holder *i*, with the latter telescoped within said box, any suitable means may be provided. As an exemplification of one means for effecting this purpose a slidable clip *l* is shown as associated with the bottom of the box *a*, said clip having a detachable engagement with the bottom *j* of the holder *i*. Instead of providing a separate clip for locking the holder in its telescoped position within the chamber *b* the clips *y* may be adapted to lock said holder both within the chamber and supporting the same in its withdrawn position. To accurately guide the holder *i* and insure even movement of both sides thereof as it is shifted in the box *a*, vertical strips or guide-ribs 2 are secured to the inner faces of the opposite walls of the chamber, with which engage slots or recesses 3 in the adjacent edges of the projecting portions or surrounding flange of the bottom *j*. The latter flange coacting with the flange *h* not only provides means, as premised, for maintaining the chamber *b* light-tight, but it further provides means for preventing the complete withdrawal of the holder from the chamber *b* or the accidental detachment of said holder from the box *a*.

An important feature of the construction described is that no movement of the film occurs within the holder during the movement of the latter relative to the box. Consequently the camera may be focused to take a picture upon one of the receiving-sections of the film, and if for any reason the exposure is not made after the holder is returned to its position the camera may be focused any number of times thereafter, and when the picture is finally secured it will be taken upon the section of the film for which the camera was first focused. Thus the film itself is operated exactly as in the ordinary non-focusing film-cameras, the manipulation of the parts necessary to focus my camera in no wise affecting said film or the feed thereof.

The construction and operation of my invention will be readily understood upon reference to the foregoing description and accompanying drawings, and it will be appreciated that the parts and combinations recited may be varied within a wide range without departing from the spirit of the same.

Having thus described my invention, what is claimed as new, and desired to be secured by Letters Patent, is—

1. In a camera the combination with the outer box or casing and having the lens at one end and the focusing-screen at the other, of the roll-holder vertically movable in the casing between the lens and screen having the spool-chambers at the sides of the forward portion, the removable slide or cover and the removable closure for said holder embodying the side and end boards, the back being provided with a sight-opening therein.

2. In a camera the combination with the outer box or casing having the lens at one end and the focusing-screen at the other, of the roll-holder vertically movable in the casing between the lens and screen, having the outwardly-opening spool-chambers at the sides of the forward portion and the film-guides at the rear, the interior walls of said holder forming an exposing-chamber, the cover for the film and the removable closure extending around the rear end of the holder and over the outer sides of the spool-chambers.

3. In a camera and in combination, a box, a lens and focusing-glass associated therewith, and a film-holder, carrying the entire film, permanently connected to said box movably mounted therein to carry the film into and out of the compass of the light-rays passing through said lens, substantially as described.

4. In a camera and in combination, a box comprising a lens and shutter-operating section, a focusing-glass section, and a film-holder-receiving chamber interposed between said sections, and a film-carrier permanently attached to said box and movable bodily into and out of said chamber, substantially as described.

5. In a camera and in combination, a section carrying a lens and a focusing-glass, and a film-holder permanently connected thereto and telescopically mounted therein, substantially as described.

6. In a camera and in combination, a box, a lens and focusing-glass associated therewith, said box having a film-holder-receiving chamber therein, a film-carrier movable into and out of said box, and coacting flanges on the box and holder for closing said chamber to exclude the light therefrom, substantially as described.

7. In a camera and in combination, a box, a lens, and focusing-glass associated therewith, said box having a film-holder-receiving chamber therein, a film-carrier movable into and out of said box, overhanging flanges on the edges of the walls of said chamber, and flanges on the holder coacting therewith, substantially as described.

8. In a camera and in combination, a box, a lens and focusing-glass associated therewith, said box having a film-holder-receiving section, a flange overhanging the wall thereof, a film-holder movably mounted in said chamber to carry the film into either of two positions, said holder including a top and bottom, each having a flange coacting with the first-mentioned flange, substantially as described.

9. In a camera and in combination, a box, a lens and focusing-glass associated therewith, said box having a film-holder-receiving chamber, and a film-holder movably mounted in said chamber, comprising a permanent front wall having an exposure-opening therein, a top and bottom, a film-guide arranged between the same, a detachable sectional casing having the vertical edges of the side sections thereof secured to the vertical edges of said front wall, guideways secured to said wall, and a slide for closing said opening guided in said ways and having a part acessible through the top of said holder, substantially as described.

In testimony whereof I have hereunto signed my name, in the presence of two attesting witnesses, at New Rochelle, in the county of Westchester and State of New York, this 4th day of December, 1902.

GEORGE H. DORR.

Witnesses:
M. J. COMERFORD,
A. LAUSS.